Figure 1:
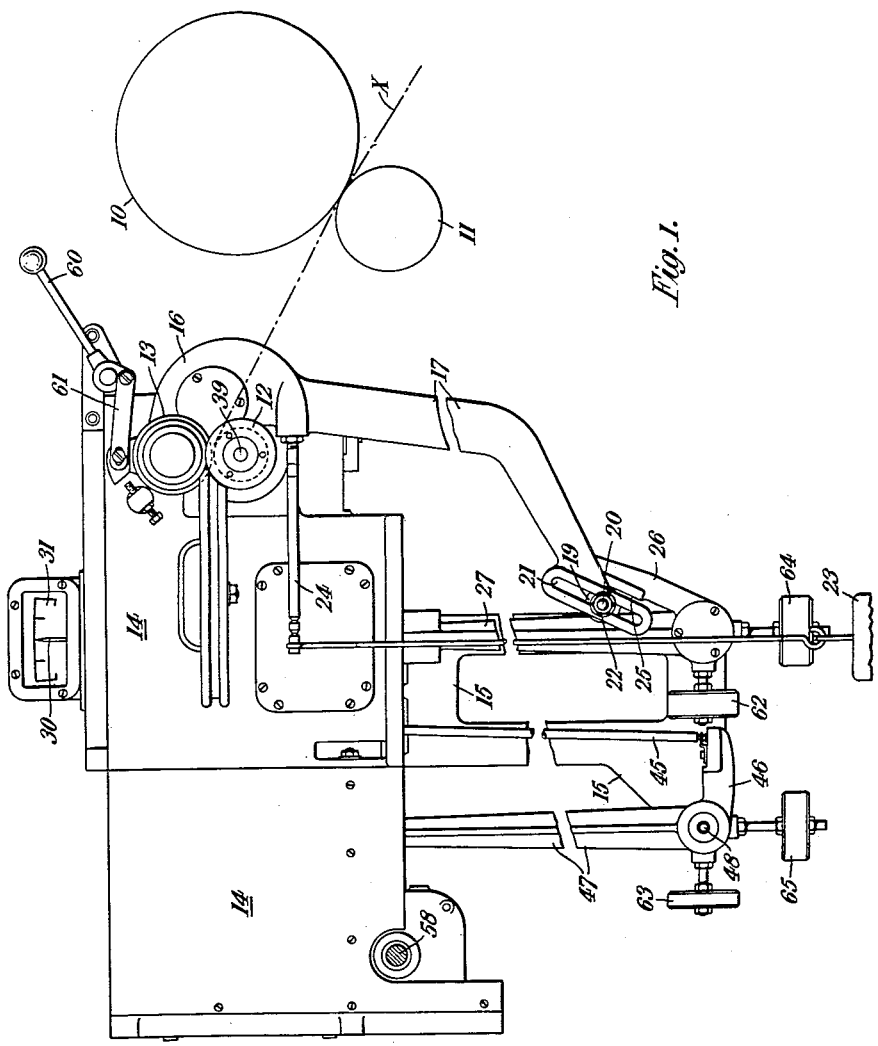

May 22, 1956 G. F. RAPER 2,746,093
APPARATUS FOR DETECTING AND CORRECTING IRREGULARITIES
OF THICKNESS OF A TEXTILE SLIVER
Filed Aug. 8, 1952 6 Sheets-Sheet 1

May 22, 1956  G. F. RAPER  2,746,093
APPARATUS FOR DETECTING AND CORRECTING IRREGULARITIES
OF THICKNESS OF A TEXTILE SLIVER
Filed Aug. 8, 1952  6 Sheets-Sheet 2

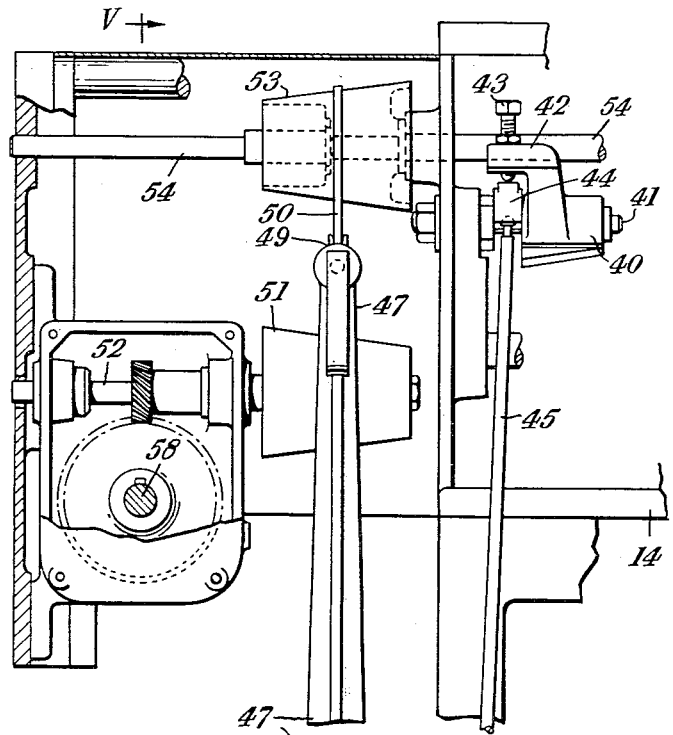
Fig. 4.
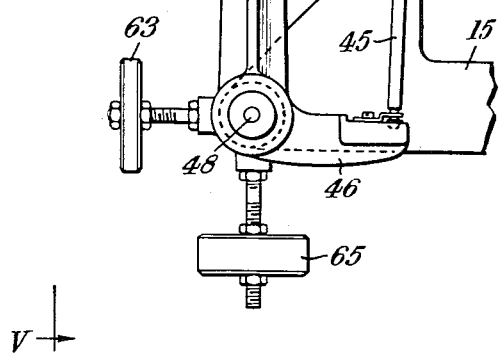

United States Patent Office 2,746,093
Patented May 22, 1956

2,746,093

APPARATUS FOR DETECTING AND CORRECTING IRREGULARITIES OF THICKNESS OF A TEXTILE SLIVER

George Frederick Raper, Eastbourne, Darlington, England, assignor to T. M. M. (Research) Limited, Helmshore, Rossendale, Lancashire, England Application August 8, 1952, Serial No. 303,385

Claims priority, application Great Britain August 14, 1951

2 Claims. (Cl. 19—70)

The invention relates to apparatus for detecting and correcting irregularities of thickness of a textile sliver, such apparatus being of the known type in which a sliver passes through a drafting unit controlled by the action of a relay which is responsive to irregularities sensed by a detector located in advance of, or which is part of, the drafting unit, and in which the relay comprises a train of axially-movable parallel rods which move along a path between a setting element and a transmitting element operatively associated with the drafting units and are actuated by the said setting element so that they project beyond a datum position by an amount which is proportional to the instantaneous thickness of the sliver by which the detector is influenced, and in which the projecting ends of the rods are caused to act upon the surface of the transmitting element so that, on making contact with the latter, they displace the transmitting element to a greater or less extent and consequently vary the degree of draft introduced by the drafting unit.

In certain known apparatus of said type, the transmitting element comprises a rocking shoe consisting of a pivoted U-shaped member the inwardly facing surfaces of the limbs whereof are arranged to bear against the two extremities of each of the relay rods in turn, the intention being that, according to the axial positions of succeeding rods, the U-shaped member will be angularly displaced about its pivot in the direction of the rod axis. This form of transmitter is however unsatisfactory and indeed almost impracticable since, unless the contact surfaces of the transmitter limbs are so narrow as to bear only against one rod at a time, the U-shaped member cannot partake of the lateral movement necessary to enable it to engage the next rod without jamming. On the other hand, if the transmitter limbs are made sufficiently narrow to avoid jamming, the contact surfaces must be flared at such a wide angle on the entry side to enable the U-shape member to accommodate itself to the position of the next rod, that an undue degree of friction is developed between those surfaces and the ends of the rods.

Some of the disadvantages of the aforesaid apparatus may be avoided by dispensing with one arm of the U-shaped member, thereby providing a transmitter that works on one end of each rod only. It will be clear, however, that such an arrangement could work only if spring or other means were provided to maintain the transmitter in contact with the rod ends, and if positive holding means were provided to prevent axial sliding of the rods by virtue of their contact with the transmitter member. This arrangement, moreover, would still possess a grave disadvantage inseparable from the use of a transmitter bearing directly against the rod extremities and displaced by the latter in the direction of the rod axes, viz. that since textile slivers are often very irregular in thickness, and may lead to considerable differences in the amount of projection of neighbouring rods, a transmitter that bears directly against the rod extremities receives the full effect of such differences, so that its movements, and the adjustments which it transmits to the drafting unit, are unduly abrupt.

It is the object of the present invention to provide, in an apparatus of the said type, improved means whereby all the foregoing disadvantages may be avoided. Accordingly, I employ a relay in which the extent of the projection of the axially-movable rods in either direction beyond a datum setting is measured by a transmitter element arranged so that the direction of its movement in relation to the rod with which it is in contact is always at an angle to the rod axis.

The relative disposition of the transmitter element and the relay rod with which it is in contact is such that the major axis of the rod does not pass through the point, line or surface of contact between the rod and the transmitter. Further, the reactive force between the rod and the transmitter always acts at an angle to the rod axis, and the component of the said reactive force which is aligned with the rod axis is always less than the component normal thereto.

The under-surface of the transmitter element is preferably inclined to the rod axis at an angle not exceeding 15 degrees, so that assuming the rods to be cylindrical, the transmitter makes contact with the circular edges at their ends, working more nearly on the sides of the rods than on their very extremities.

It will be appreciated that this arrangement of transmitter element and relay rods considerably reduces the amount of movement of the transmitter between successive rods, and thereby gives a much smoother action to the transmitter and the drafting rollers. The arrangement has the further advantage that since the angle of inclination is small, the tendency of the rods to slide axially under the influence of the transmitter is substantially eliminated, and the transmitter element may be applied only at one end of the rods. It should be understood, however, that I do not limit myself to the use of a transmitter bearing on one end of the rods only. The transmitter herein described may be provided with a second arm or limb to bear on the opposite ends of the rods; provided that the two arms are suitably shaped, and disposed in relation to the rods as hereinafter described.

Figure 2:
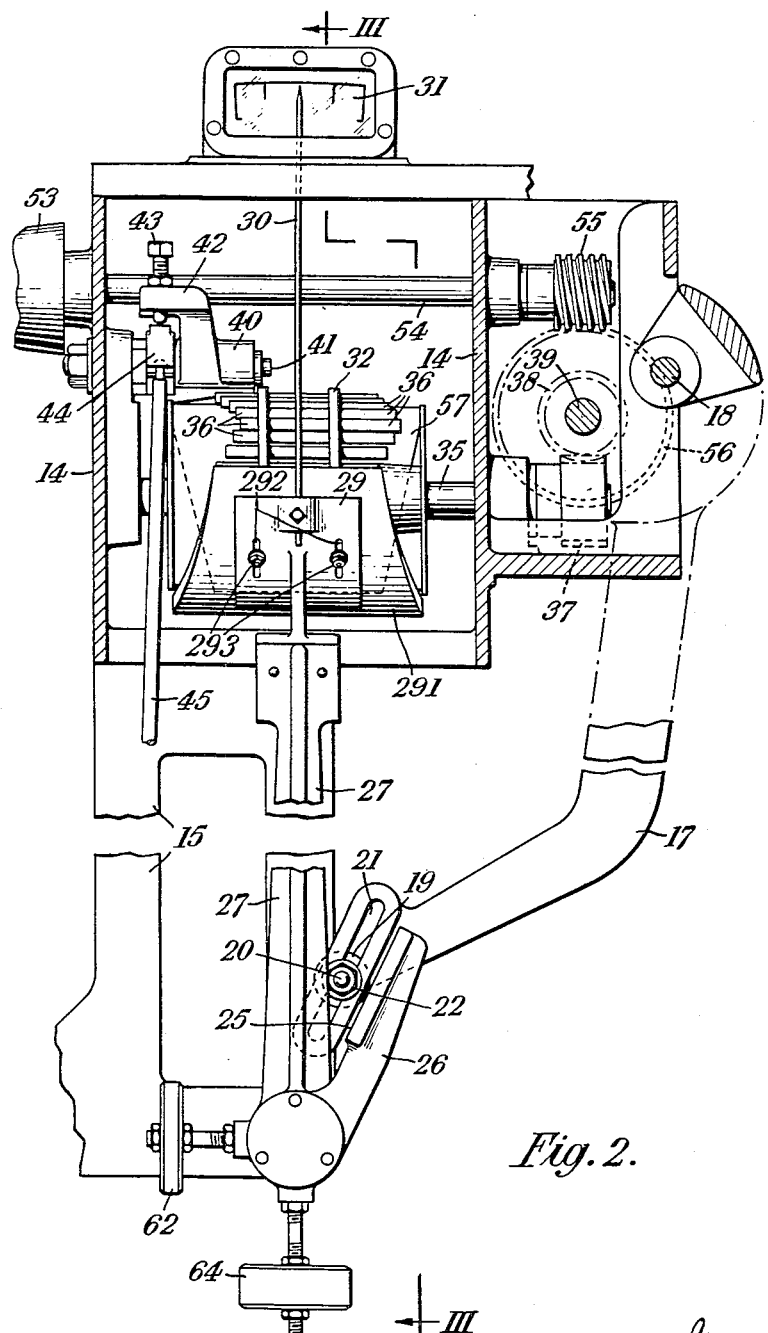
Figure 3:
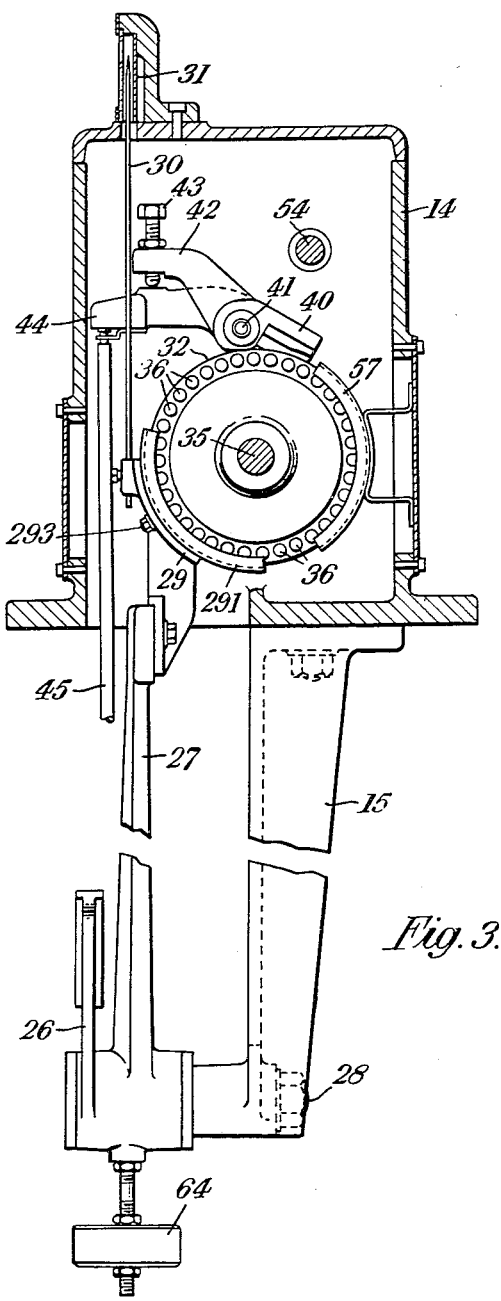
Figure 5:
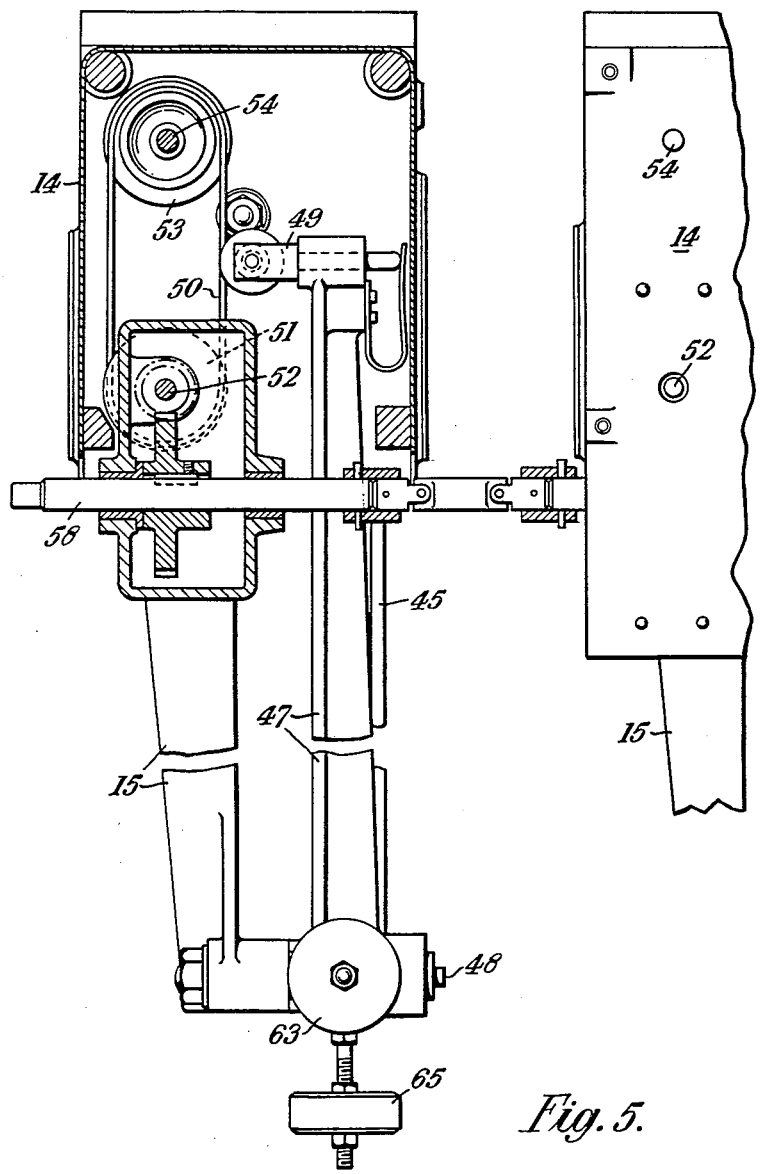
Figure 6:
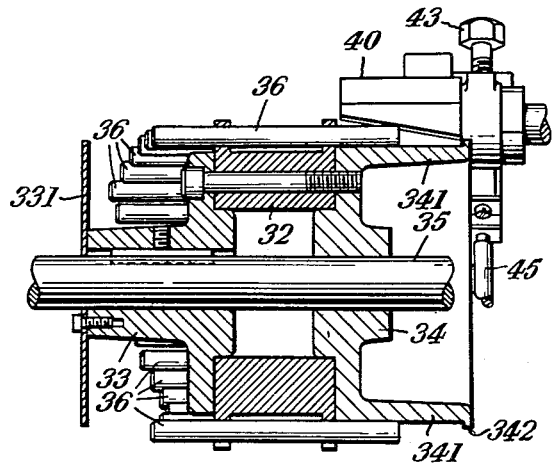
Figure 7:
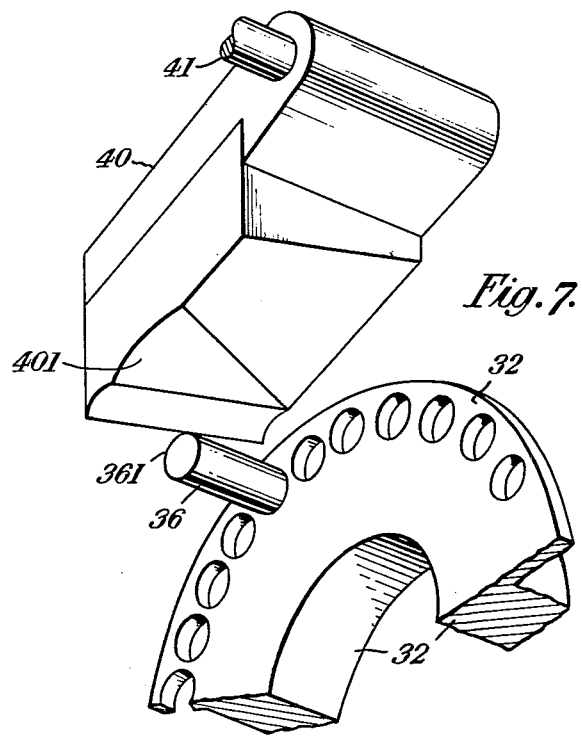

One form of apparatus in accordance with the invention, as applied to the detection and correction of irregularities of thickness of a sliver in its passage through the drafting head of a spinning machine, is illustrated diagrammatically in the accompanying drawings, of which Fig. 1 is a side elevation of the apparatus, Fig. 2 is a partly sectional side elevation of those parts of the apparatus seen in the right-hand portion of Fig. 1, Fig. 3 is a vertical section on the line III—III of Fig. 2, Fig. 4 is a partly sectional side elevation of those parts of the apparatus seen in the left-hand portion of Fig. 1, Fig. 5 is a vertical section on the line V—V of Fig. 4, Fig. 6 is a large-scale detail section of the rod-wheel relay and the transmitter element associated therewith, and Fig. 7 is a fragmentary perspective view depicting the positional relationship between the relay rods and the transmitter plate.

In Fig. 1 the dotted line indicated by the reference letter X traces the path of the sliver through the drafting apparatus, of which the front pair of the cooperating upper and lower drafting rollers are shown at 10, 11, and the rear pair at 12, 13.

The roller-driving mechanism and the parts of the apparatus which are more closely associated with control thereof are enclosed in a casing 14 from which a bracket 15 depends, to provide support for the fulcra of the setting-element lever and cone-belt drive adjustment lever hereinafter described.

The rear pair of rollers 12, 13 are utilised as the detector by which variations in the thickness of the sliver are signalled to the mechanism by which the operation of the drafting head is so modified that such variations will be corrected by suitably modifying the degree of attenuation to which the sliver is subjected. For this purpose the roller 12 is grooved and the roller 13 is provided with a peripheral flange adapted to run in the groove of the roller 12 and to bear upon the sliver passing over the same. Whilst the axis of the roller 12 is fixed, the roller 13 is supported in bearings carried by an arm 16 of a double-armed lever 16, 17, which is pivoted upon a stud 18 (Fig. 2) and the other arm 17 of which carries a bowl 19. Said bowl 19 is mounted upon a stud 20 in a slot 21 at the end of said lever arm 17, the arrangement being such that the effective length of said lever can be varied within the limits of the length of the slot 21 by re-setting said stud 20. A nut 22 is provided for securing said stud in position.

A weight 23, which is suspended from an arm 24 attached to the lever arm 17, serves to maintain the working pressure of the roller 13 on the sliver as it passes over the roller 12. The bowl 19 cooperates with the face 25 of an arm 26 which forms an integral part of a lever 27 pivoted at 28 (Fig. 3) upon a stud carried by the lower extremity of the bracket 15. The upper end of said lever 27 carries the setting-element 29, the member by which the relay is influenced to transmit corrective signals, proportionate to the variations in thickness of the sliver, to the mechanism employed to effect corresponding modifications in the attenuation of the sliver in the drafting field, and it will be seen that the setting-element lever 27 is displaced angularly from a datum position to a degree dependent upon the instantaneous displacement of the detector roller 13 in relation to the companion roller 12. The degree of displacement of the setting-element 29 is indicated by a pointer 30 which is affixed to said element and the tip of which is arranged to move across a scale 31.

The relay takes the form of a rod-wheel (Fig. 6), that is to say a cylindrical cage comprising a double-flanged annulus 32 which is mounted between two spaced hubs 33, 34 which are fixed on a shaft 35, the flanges of said annulus 32 being pierced by concentric rows of holes in each of which is received a rod 36 with capability of sliding freely therein with a minimum of frictional resistance. The shaft 35 is geared by worm 37 and worm-wheel 38 to the shaft 39 (Fig. 2) of the detector roller 12, from which latter the rod-wheel receives its drive. As the wheel rotates and the rods 36 are carried round, each rod in turn comes under the influence of the setting-element 29, which operates to vary the extent to which the rod projects at one end, i. e. towards the left-hand side as viewed in Fig. 2, by an amount which is a measure of the instantaneous thickness of the sliver between the detector rollers 12, 13. To enable it so to operate, said element 29 is fashioned with an arcuate portion 291 having converging terminal flanges between which the rods 36 are guided and which serve to displace the rods slidably in the annulus 32 in accordance with the angular displacement of the setting-element lever 27. Said portion 291 is capable of being adjusted in relation to the element 29 about the axis of the shaft 35; for this purpose the element 29 is slotted at 292 to permit of a suitable range of movement of the securing nuts and bolts 293.

The transmitter element which cooperates with said relay rods 36 consists of a plate 40 which is mounted upon a fixed pivot 41 in a position adjacent the periphery of the rod-wheel so that the under-surface of said plate rides upon the sides of the projecting parts of the rods 36 at one end thereof. An arm 42 integral with said plate 40 is arranged to bear by means of an adjustable setscrew 43 upon a tappet arm 44 which also is mounted on said pivot 41 and which rests upon the upper extremity of a push-rod 45 (Fig. 4). At its lower extremity said push-rod 45 is supported by an arm 46 integral with a lever 47 which is pivoted at 48 and which carries a belt-fork or equivalent member 49 in operative relationship to a driving belt 50 which is used to transmit driving motion between a cone pulley 51 on an input drive-shaft 52 and an oppositely disposed cone pulley 53 on a shaft 54, which shaft 54 is geared by a worm 55 and worm-wheel 56 to the shaft 39 of the lower back drafting roller 12.

In order to support the projecting parts of the rods 36 against distortion under the pressure of the transmitter plate 40, the hub 34 is preferably provided with a sleeve-like extension 341, of which the peripheral surface is tangential to the inside surfaces of the rods.

The relay rods 36 being cylindrical, the circular edges 361 at their ends (Fig. 7) provide contact between each rod and the transmitter plate 40 and since the bearing or contact surface 401 of the plate is preferably inclined to the rod axis at an angle not exceeding 15 degrees, it will be seen that the plate works more nearly upon the sides of the rods than upon their very extremities.

As the transmitter plate 40 rides over the sides of the rods at their projecting ends, it is deflected about the axis of its pivot 41 to a greater or less degree dependent upon the algebraic amount by which each rod 36 in turn projects beyond the previous or succeeding rods. Were the input sliver being processed perfectly uniform in thickness, each rod 36 would project to the same extent and the angular displacement of the transmitter plate 40 would remain constant. In practice however it is found that the sliver thickness varies over a considerable range and a correspondingly wide range of movement of the transmitter plate 40 results; such movements are utilised to bring about the requisite variation in the speed of the roller 12 of the drafting unit which is necessary to eliminate the irregularity in sliver of yarn thickness to which the transmitter plate movement is due. As will be understood, the several operations of the apparatus are so timed as to take account of the period which elapses whilst a particular part of the sliver is travelling from the detector to a point in the drafting zone between the rollers 12, 13 and the front rollers 10, 11.

After the rods 36 have travelled past the transmitter 40, they are re-set in a datum position by a stationary flanged guide-plate 57, the distance between the flanges of which is gradually diminished so that the ends of projecting rods 36 are pushed inwards to the common datum line by contact with the inclined inner surfaces of the flanges of the guide-plates 57 preparatory to coming under the influence of the setting element 29 at the next rotation of the rod-wheel.

It is important that the rod-wheel be provided with means whereby the endwise displacement of the rods 36 by the setting element 29 is restricted within the range of projection which can be dealt with by the re-setting guide-plates 57, in order to avoid the possibility of damage to the apparatus being caused by a rod which projects so far that its end overhangs the flared end of the guide-plate 57 and is consequently not capable of being retracted thereby. For this purpose the extension 341 of the hub 34 is furnished with a terminal flange 342 which serves as an abutment limiting the endwise displacement of the rods 36, and a plate 331 is mounted on the outer face of the hub 33 to limit movement in the opposite direction.

It is of major importance that a correct relationship be preserved between the thickness of the ingoing sliver and the requisite draft. This relationship may be disadvantageously affected by such factors as the natural characteristics of a non-linear speed-gear incorporated in the mechanism, slip or creep of driving belts, differences in the stroke of levers according to their position with respect to a dead centre, and to differences in the compressibility of slivers of certain materials according to their physical condition at different times. These factors can be compensated by suitably varying the shape of the contacting surface 401 of the transmitter plate 40 viewed along the path of the rods 36 at the contact point.

The pivotal axis of the transmitter plate 40 may be parallel to the rod axes (as shown), or parallel to the tangent of the circular path of the rods 36 at the point of their contact with the plate 40, or it may occupy any angular position intermediate those two positions, or any other position that will ensure that the contact surface 401 of the transmitter plate 40 bears more nearly on the sides of the rods than on their ends.

It will be understood that the distance between the nip of the front drafting rollers 10, 11 and that of the back rollers 12, 13 will depend upon the stable length of the fibrous material which is being processed. Apparatus for processing worsted sliver such as that illustrated in the accompanying drawings may be provided with the usual carrier and tumbler rollers between the rollers 10, 11 and the rollers 12, 13; in the case of machines for cotton and other short-stapled fibres the conventional intermediate rollers and/or apron conveyor systems may be provided in the drafting zone, and flax- or jute-spinning machines may be furnished with a gill-box in that region.

In the conventional spinning machine incorporating a plurality of aligned spindles, a separate corrective apparatus such as that hereindescribed will be provided at each spindle, the drive-shafs 52 of the respective apparatuses being geared to a common transmission shaft 58 (preferably of articulated form, as shown in Fig. 5) which extends longitudinally throughout the machine.

In order to facilitate threading of a sliver between the rollers 12 and 13, the lever 16, 17 may be swivelled by means of a hand-lever 60 connected through a link 61 to the arm 16 of said lever 16, 17, so as to raise the roller 13 temporarily out of the operative position.

The counter-weight 62 serves to preserve working contact between the bowl 19 and the face 25 of the arm 26. The counter-weight 63 which is fixed to the boss of the lever 47 imparts the requisite degree of pressure to the transmitter plate 40 upon the rods 36 and also prevents lost motion between the parts 44, 45 and 46. Centralizing weights 64 and 65 are carried by the levers 27 and 47. Springs may be substituted for any or all of such counter-weights and centralizing weights, if desired.

In an alternative embodiment the rollers employed to detect irregularities of sliver thickness are separate from the rollers of the drafting apparatus, in which case the signals derived from the detector rollers are transmitted, after amplification, to means for suitably varying the speed of a pair of the drafting head rollers.

What I claim as my invention and desire to secure by Letters Patent is:

1. An apparatus for detecting and correcting irregularities of thickness of a textile sliver, comprising, in combination, a wheel, means for driving the wheel, a series of relay rods mounted on the wheel with capacity for sliding movement axially thereof, means responsive to sliver thickness for successively adjusting the rods axially of the wheel, and a transmitter comprising a member disposed to bear laterally against a side extremity of each successive rod, and having a rod engaging face which extends at an angle of less than 45° to the rod axis, and means supporting said member with capacity for movement toward and from the axis of the engaged rod, the means responsive to sliver thickness for successively adjusting the rods comprising a pair of detecting rollers between which the sliver is nipped, a first lever supporting one of said rollers and mounted with capacity for oscillating in response to variations of thickness of the sliver through an angle proportional to such variations, a bowl on said first lever, a setting element for the rods, a second lever carrying said setting element and having a face engaged by the bowl, and means yieldingly urging the second lever toward engagement with said bowl, the construction and arrangement being such that the movements of the detector roll-carrying arm of the first lever, due to variations in sliver thickness, are amplified by the setting element and are thereby effective to govern the extent of adjustment of the rods.

2. An apparatus for detecting and correcting irregularities of thickness of a textile sliver, comprising, in combination, a wheel, means for driving the wheel, a series of relay rods mounted on the wheel with capacity for sliding movement axially thereof, means responsive to sliver thickness for successively adjusting the rods axially of the wheel, and a transmitter comprising a member disposed to bear laterally against a side extremity of each successive rod, and having a rod engaging face which extends at an angle of less than 45° to the rod axis, and means supporting said member with capacity for movement toward and from the axis of the engaged rod, the wheel including an internal sleeve over which the rods are adapted to slide, which sleeve supports the rods laterally against deflection by the transmitter.

References Cited in the file of this patent

UNITED STATES PATENTS

| | | |
|---|---|---|
| 1,132,316 | Eves | Mar. 16, 1915 |
| 2,681,475 | Raper | June 22, 1954 |